United States Patent [19]

Mentschel

[11] 3,954,422
[45] May 4, 1976

[54] MULTI-STAGE REFORMED-GAS GENERATOR

[75] Inventor: Hellmuth Mentschel, Erlangen, Germany

[73] Assignee: Siemens Aktiengesellschaft, Munich, Germany

[22] Filed: Feb. 26, 1974

[21] Appl. No.: 446,093

[30] Foreign Application Priority Data
Mar. 6, 1973 Germany............................ 2310995

[52] U.S. Cl. ...................................... 48/89; 23/284; 23/288 R; 23/288 D; 48/DIG. 5
[51] Int. Cl.² ............................................ C10B 1/00
[58] Field of Search ............................ 48/89, DIG. 5; 23/288 D, 288 R, 284; 252/477 R

[56] References Cited
UNITED STATES PATENTS

| | | | |
|---|---|---|---|
| 3,167,399 | 1/1965 | Hansen, Jr. ............................ | 23/284 |
| 3,620,685 | 11/1971 | Rogers ................................ | 23/288 R |
| 3,751,232 | 8/1973 | Borre et al. ......................... | 23/288 R |

FOREIGN PATENTS OR APPLICATIONS

| | | | |
|---|---|---|---|
| 763,944 | 7/1967 | Canada .......................... | 252/477 R |

*Primary Examiner*—S. Leon Bashore
*Assistant Examiner*—George C. Yeung
*Attorney, Agent, or Firm*—Kenyon & Kenyon Reilly Carr & Chapin

[57] ABSTRACT

A multi-stage reformed-gas generator(fuel converter) of the type having at least two reaction chambers, each of which containing a catalyst, with the two being connected in series in a flow direction, and means for supplying a gas acting as an oxygen carrier to the reaction chambers and means for supplying fuel gas through the chambers in the flow direction. The catalyst is arranged in the reaction chambers between gas permeable surfaces which separate the reaction chambers from each other and by means of which the gas serving as an oxygen carrier can be fed to the reaction chambers, in which the oxygen carrier gas and the fuel gas are contacted with each other substantially in perpendicular direction to their respective flows in the chamber.

17 Claims, 4 Drawing Figures

MULTI-STAGE REFORMED-GAS GENERATOR

BACKGROUND OF THE INVENTION

This invention relates to multi-stage reformed-gas generators (fuel converters) in general, and more particularly to an improved type of multi-stage reformed-gas generator.

A gas generator of this general type is disclosed in U.S. application Ser. No. 372,422 filed June 21, 1973 and assigned to the same assignee as the present invention. As disclosed therein, a reformed-gas generator of this nature is useful for the operation of internal combustion engines. It comprises essentially two reaction chambers, each containing a catalyst with the reaction chambers connected for series flow. Between the reaction chambers, means for feeding in a gas serving as an oxygen carrier is provided. As disclosed therein, the second reaction chamber may be followed by further reaction chambers with a gas serving as an oxygen carrier fed into the flow between subsequent chambers.

A reformed-gas generator of this nature is capable of converting liquid, hydrocarbon fuels which are low in harmful substances, i.e., fuels containing no additives such as lead or cyclic hydrocarbons and which have a low sulfur content, into a gas mixture containing methane, carbon monoxide and/or hydrogen. In order to obtain a sootless conversion, this fuel low in harmful substances is evaporated and after evaporation mixed with a gas serving as an oxygen carrier which is at least partially made up of quantities of exhaust gas fed back from the internal combustion engine and/or other gases such as air serving as oxygen carriers. The mixture obtained is then conducted over the catalyst at elevated temperatures. The gas mixture (reaction gas) obtained by conversion at the catalyst is then fed, after a further amount of gas serving as an oxygen carrier is mixed therewith to the internal combustion engine and burned therein. In the operation of an internal combustion engine using such a reformed gas generator, the content of harmful substances found in the exhaust gas is substantially reduced.

In the specific embodiment disclosed in the above identified application, the reaction chambers each contain one or more catalyst carriers which are preferably in the form of highly porous, perforated sintered blocks, each in turn containing catalyst. These sintered blocks are provided with a large number of passage holes arranged approximately parallel to each other and in the direction of flow of the gases flowing through the generator. In the disclosed embodiment, the gases serving as oxygen carriers are fed to the mixture between the reaction chambers using separate mixing chambers which are arranged between and separate the reaction chambers. Specifically, the evaporated fuel is mixed with a gas serving as an oxygen carrier, such as air and/or fed-back exhaust gases, in a mixing chamber ahead of the first reaction chamber and then fed into that chamber. To the gas mixture leaving the first reaction chamber, which will comprise reformed gas and components of unreacted fuel vapor, additional gas serving as an oxygen carrier is added in a further mixing chamber after which the gas mixture with additional oxygen is fed to a second reaction chamber where the fuel components which have not yet been reacted are converted.

Although this type of generator works well, the perforated sintered blocks used as catalyst carriers have a relatively high specific gravity and are relatively expensive to manufacture. Thus, there is a need for a multi-stage reformed-gas generator of this general type, in which the catalyst material has a lower specific gravity than that of perforated sintered blocks and is at the same time less expensive to manufacture while still maintaining the necessary reaction capabilities. Furthermore, the gas generator described in the above identified application is somewhat bulky and thus, an improved gas generator which is more compact is desirable.

SUMMARY OF THE INVENTION

The present invention provides an improved reformed gas generator of the general type described above which uses catalyst of lower specific gravity, which is cheaper and easier to manufacture, and in the preferred embodiment, arranges the reaction chambers such as to obtain maximum reaction within the smallest volume. This is accomplished by arranging the catalyst in the reaction chambers between gas permeable surfaces, such as perforated surfaces or a gas permeable fabric and which act to separate the reaction chambers with each other. The gas serving as an oxygen carrier is fed to the reaction chamber through the perforated surfaces or the gas permeable fabric. Furthermore, in the individual reaction chambers the catalyst is in the form of a piled charge of hollow porous ceramic spheres. Preferably, these spheres will be spherical corundum with a wall thickness of 0.1 to 0.5 mm and a diameter of between 1 to 4 mm. Preferably the wall thickness will be about 0.3 and the diameter 1.5 to 2.5 mm. With dimensions such as these, a very large surface area per unit volume is available and at the same time the spheres resting against each other will leave large enough gaps so that the pressure drop for the gas flowing through the reaction chamber will remain low. Spheres of this nature made of spherical corundum have a catalytic activity by themselves without further catalyst being added thereto. However, preferably these spheres will serve as carriers for a further catalyst such as platinum or mixed platinum and nickel. They can be impregnated with such materials in conventional fashion. In order that flow conditions be as uniform as possible within each reaction chamber, the hollow spheres are made of essentially uniform diameter within each piled charge.

The gas permeable separating members preferably are made such that they distribute the oxygen carrier uniformly over the entire flow of cross section of the reaction gas. It is particularly important that as even a distribution as possible be maintained within the hollow sphere charges of the individual reaction chambers. This may be accomplished through the use of perforated sheet metal or the like having a plurality of areas provided with openings through which the reaction gas can pass from one reaction chamber to the other. Between these areas, double wall areas can be provided on the perforated surface by attaching parts to form canals extending between the reaction chambers which canals will have openings through which the fresh air can enter directly from the canals into the nearest reaction chamber in the flow direction.

Although such an arrangement is quite workable, a particularly simple design disclosed in connection with the preferred embodiment results from the use of a gas permeable fabric. In order to obtain high strength and long service life, this fabric preferably will be made of V2A steel wire. In weaving the fabric, different fabric weaves such as linen weave, metaltwist or twill weave can be used. The type of cross weaves as well as the thickness of the warp and woof filaments can be selected so that the desired quantities of fresh air and/or exhaust gas to be needed will be supplied. In this arrangement, while the reaction gas is passed from one reaction chamber to the other perpendicular to the surface of the fabric, the fresh air or exhaust gas flows along the surface of the fabric in the gaps resulting from the fabric itself and the arrangements of the spheres thereagainst and enters into the flow to be mixed with the reaction gases. Naturally, the mesh of the gas permeable fabric will be chosen, if possible, to be smaller than the diameter of the particles of catalytic material, i.e., the ceramic porous hollow spheres.

The disclosed embodiment is of a particularly compact and simple design. This is accomplished by arranging the reaction chambers and the gas permeable surfaces between them in a cylindrical shape with the chambers concentric to each other. In order to feed in the oxygen carrier, ring lines are provided at at least one end of the cylinder thus formed which ring lines connect with the perforated surfaces or gas permeable fabric. In the disclosed embodiment, the cylinder has a bottom plate to which the gas permeable separation means are attached with slots provided in the bottom plate providing paths for the gas from the ring lines to the perforated surfaces or gas permeable fabric.

As noted above, spherical corundum is preferred as the catalyst charge. It has a number of special advantages over other possible charges. It is not only simpler and cheaper to produce than, for example, perforated sintered blocks, but also has greater strength and higher temperature cycling stability than the former. Morever, its volume relative to its surface is quite small and its thermal time constant shorter than that of perforated sintered blocks so that the danger of overheating the catalyst is minimized. The walls of such hollow corundum spheres in addition, contain almost uniformly distributed pores making possible an unimpeded exchange of gas between the interior and exterior of the spheres.

DETAILED DESCRIPTION OF THE PREFERRED EMBODIMENT

Figure 1:
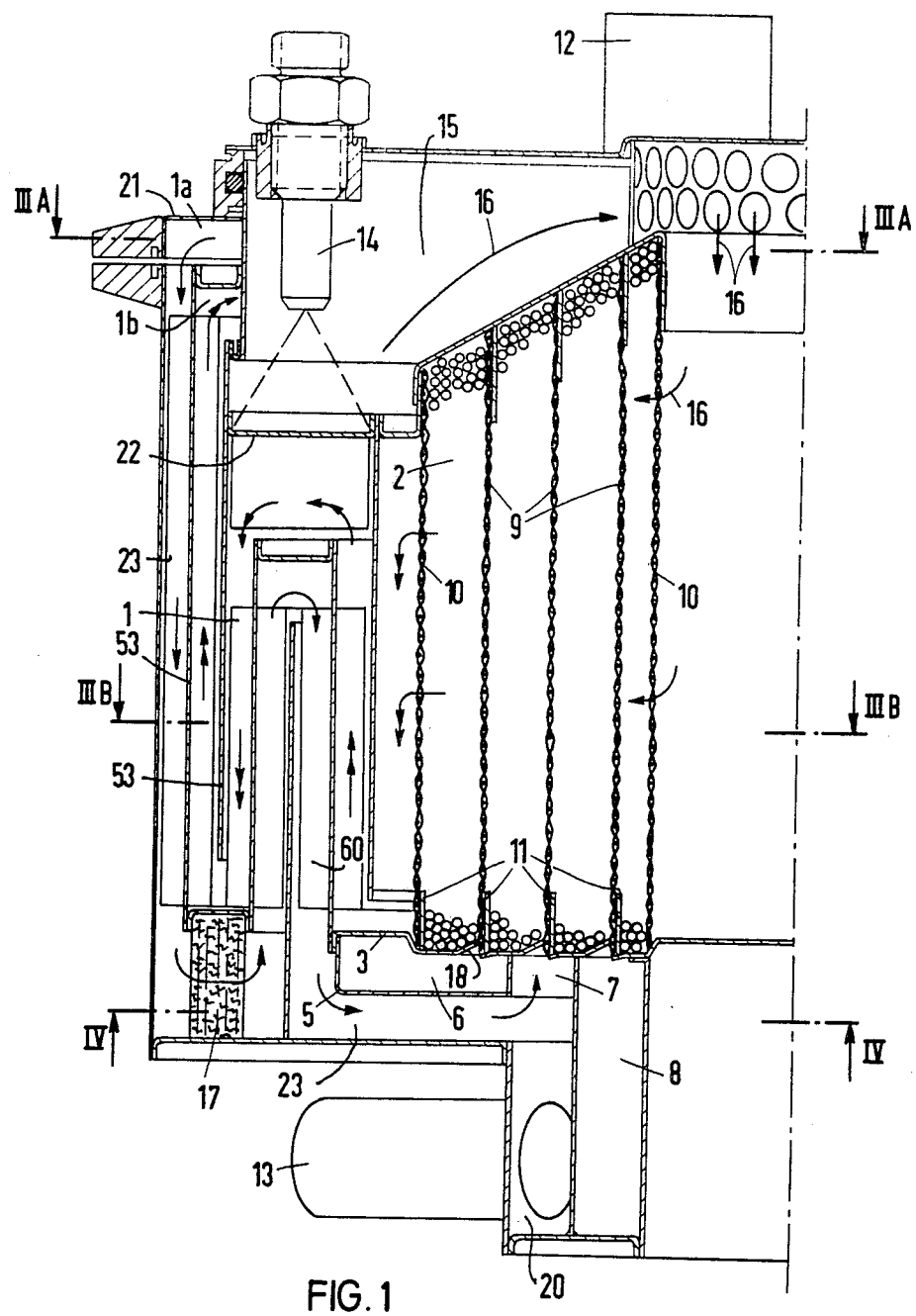
FIG. 1 is a cross sectional view through the converter of the present invention.
Figure 3:
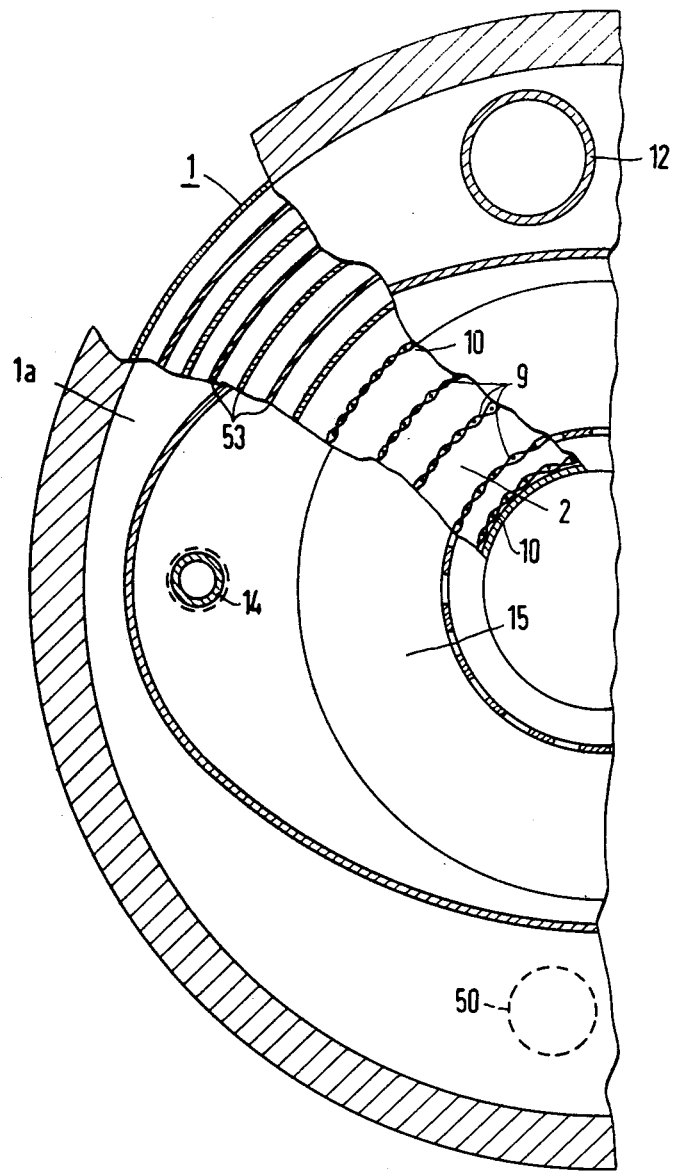
FIG. 3 is a cross section along the line IIIA—IIIA of FIG. 1 with a cutaway view taken along the line IIIB—IIIB.
Figure 4:
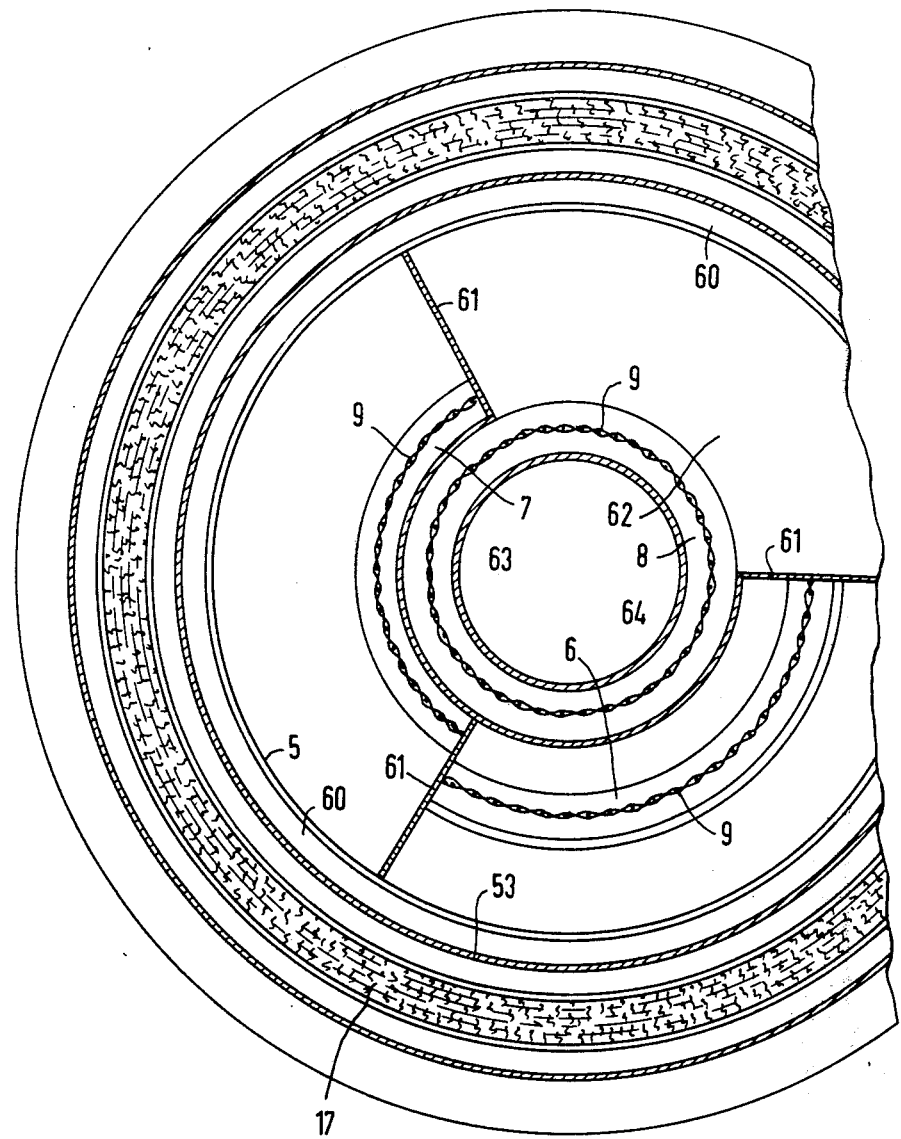
FIG. 4 is a cross section along the line IV—IV of FIG. 1.

FIG. 1 illustrates a reformed gas generator according to the present invention which includes a plurality of cyindrical, concentrically arranged reaction chambers 2 enclosed by a cylindrical heat exchanger 1. The cylindrical heat exchange 1 comprises a plurality of concentric chambers as illustrated. The fresh air or other oxygen carrier gas for the generation of reformed gas is fed into the reformed gas generator through a filter 17 in such a manner that it first passes through the heat exchanger 1 with a flow direction across that of the reformed gas generated. As is more clearly illustrated by FIG. 3, the fresh air enters through an inlet 50 shown in dotted lines to an inlet canal 1a. It is then conducted through a system of canals 23 formed by a plurality of partitions 53 shown both on FIG. 1 and on the cutaway view of FIG. 3. After flowing through the filter 17 it finally reaches the area below the baffle 5. A cover plate 21 closes off the top of the generator and contains an outlet 12 and the inlet 50 not visible in the cross secetion of FIG. 1 but illustrated on FIG. 3, and at the same time closes a ring canal 1a for air which enters the reformed gas generator. Thereafter it is subsequently divided into partial streams below baffle 5 as more fully illustrated on FIG. 4. The number of partial streams is equal to the number of air inlets needed for the individual stages of the reformed gas generator. In the example of the figure, three stages are shown. The division into partial streams is accomplished by further baffles, arranged underneath and perpendicular to the baffle 5. Each of the partial streams opens into one of three ring lines designated respectively 6, 7 and 8 and each of which is cylindrical in shape. As illustrated by FIGS. 1 and 3 the last flow canal 60 opens into the space below the baffle 5. This space is in communication with each of the three subdivided spaces 62, 63 and 64 formed by the baffles 61. The space 62 opens into the inner ring line 8, the space 63 to the middle ring line 7 and the space 64 into the outer ring line 6. In approximately the middle of each ring line the bottom plate 3 which forms the top side of the ring lines is slotted and deformed upward with a slant 18. The slots are used to pass the gas to the cylindrical fabric or perforated surfaces 9 which separate the reaction chamber and together with the sloped sections 18 to fasten and center this fabric or perforated surface 9.

The fabric or the perforated surfaces 9 serve to distribute the fed-in air over the flow cross section of the gaseous fuel or the gaseous reaction product (reformed gas), respectively in the reaction chambers. The fuel which is fed to the reformed gas generator is sprayed using an injection nozzle 14 onto a surface, over whose lower side the hot reformed gas leaving the last reaction chamber flows. Upon striking the heated surface the fuel is then evaporated after which it is conducted for further heating in a crosswise direction to the flow of the reformed gas through a ring canal 15 and enters a first piled charge of hollow spheres flowing in the direction of arrows 16. Behind this charge of hollow spheres, the gas serving as the oxygen carrier with which the gaseous fuel is reacted in the reaction chamber containing the next charge of hollow spheres is fed in through the ring canal 8. The first charge of hollow spheres which has no oxygen carrying gas inlet is used, in particular, to prevent backfiring into the fuel inlet. After passing through the reaction chamber associated with the ring canal 8, the gas mixture produced therein passes into the next reaction chamber and then to the next with the respective reaction chambers being supplied with further gas serving as an oxygen carrier through the ring canals 7 and 6 respectively.

In the individual reaction chambers are located catalytically active bodies, preferably in the form of hollow spheres made of $\alpha$-$Al_2O_3$, for example, otherwise referred to as spherical corundum. The wall thickness of the individual hollow spheres is preferably about 0.3 mm and the diameter of the hollow spheres preferably between 1.5 and 2.5 mm. The sphere charges are restrained on the inside and outside by fabric or perforated sheets 10. The gaseous reaction product (reaction gas) is prevented from flowing at the edge of the charge through the use of cylindrical baffles 11, in order to assure approximately uniform flow over the entire area of the reaction chamber. The reaction product, i.e., the reformed gas, leaves the last reaction chamber at the last outside surface, then goes through the channels of the heat exchanger 1 in a direction counter to that of the air or other oxygen carrier which is fed in through the a filter 17 after which it is provided to the using device such as an internal combustion engine through the connection 12. Connection 12 is coupled to a canal 1b located directly below the canal 1a. Thus, as shown in FIG. 3 the connection 12 passes through the top of the canal 1a to enter canal 1b. Also shown on this view is a portion of the nozzle 14 projecting into the space 15, i.e. the ring canal which feeds evaporated fuel gas into the charge in the direction of arrows 16. Shown is the plate 22 on which the spray of gas impinges. It can be seen that the underside of the plate 22 will be subjected to hot reformed gas.

Exhaust gas from the using device can be fed to the ring lines 6, 7 and 8 in an apportioned amount through three inlet connections 13. Typically, these inlets will have throttles, not shown, installed therein which can be operated by positioning motors to control the portion of exhaust gas mixed with air or other oxygen carrier provided through the filter 17.

The fabric which is used inside the reformed gas generator as the restraint for the hollow sphere charges and/or to distribute the air-exhaust mixture, said fabric being designated by the reference numerals 9 and 10 on the figure, can be made, for example, of stainless steel wire 0.3 mm thick with the fabric having a weave which may be a linen or twill cross-weave or alternating or lace twill cross-weave. Twill weaves are more dimensionally stable than the linen weaves but are more expensive to manufacture. For distributing the air-exhaust mixture, metal twist weaves are also suitable. In all cases, the mesh of the weave determines the clear cross section for the passage of the gaseous fuel or the gaseous reaction product. Thus, the mesh should be smaller than the smallest hollow-sphere diameter. As described above, perforated sheet metal can also be used instead of fabric. In addition, it is advantageous if the fabric or the perforated sheet metal cylinders are coated with a catalyst or if they themselves are made of a material effective as a catalyst such as nickel or platinum or nickel-platinum mixture.

Figure 2:
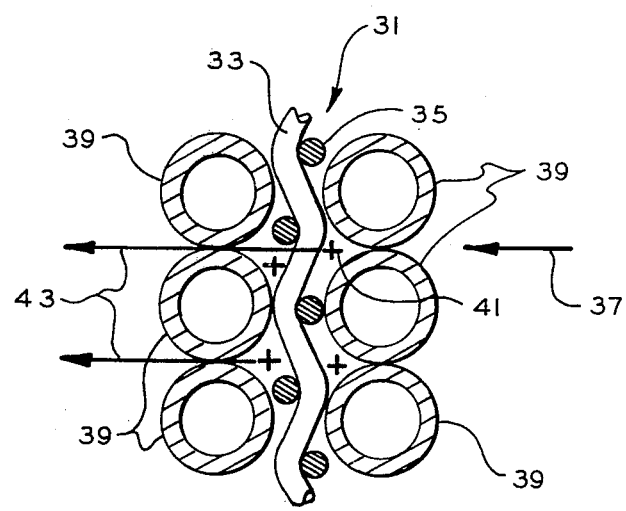
FIG. 2 is a cross sectional view illustrating a gas permeable fabric separating means with hollow spheres resting on each side thereof.

FIG. 2 illustrates the manner in which the oxygen carrying gas is fed in and mixed with the fuel gas through the use of such a fabric. Illustrated is a portion of the fabric designated generally as 31 having a woof 33 and a warp 35. Evaporated fuel flows in the direction of arrow 37. Also shown are a plurality of hollow sphere charges 39 resting against the fabric on each side. As illustrated, a plurality of spaces are thus formed at the fabric due to its construction and the sphericity of the charge which permits air to flow as indicated by crosses 41 which air or other oxygen carrier will then be carried along with the fuel gas 37 in the direction of arrows 43. In other words, the fuel gas flows through the gas permeable fabric in a first direction as indicated by arrows 37. The gas serving as an oxygen carrier flows in a second direction essentially perpendicular to that of the fuel gas as indicated by the crosses 41. At the point where these two flow paths meet the oxygen carrier gas and fuel gas are mixed and continue in the direction of the arrows 43. As indicated above, when using perforated surfaces, these surfaces can have areas which are provided with openings to which the reaction gas can pass from one reaction chamber to the other with double walled areas between these openings provided by the attachment of parts forming canals extending between the reaction chambers and having openings through which fresh air can enter directly from the canals into the downsteam reaction chamber. As also noted above, although the corumdum spheres have a catalytic activity of their own, it is preferable if these spheres are impregnated with a catalytic material such as platinum or a nickel-platinum mixture.

Thus, an improved multi-stage reformed-gas generator has been shown. Although specific embodiments have been illustrated and described, it will be obvious to those skilled in the art that various modifications may be made without departing from the spirit of the invention which is intended to be limited solely by the appended claims.

I claim:

1. In a multi-stage reformed gas generator having at least two reaction chambers each containing a charge of catalyst material connected in series in the flow direction, the flow through each of said two reaction chambers being in a first direction, said generator also including means supplying a gas serving as an oxygen carrier to each of the reaction chambers and means for supplying fuel gas and causing a flow of said fuel gas through said chambers in said first direction wherein the improvement comprises:
   a. gas permeable means separating said reaction chambers, said gas permeable means constructed to supply said gas serving as an oxygen carrier to said fuel gas flowing through said chambers said oxygen carrier gas in said gas permeable means flowing in a second direction essentially perpendicular to said first direction whereby the oxygen containing gas and fuel gas are contacted with each other substantially in perpendicular direction to their respective flows in said chamber; and wherein
   b. said means for supplying a gas serving as an oxygen carrier are connected to said gas permeable means.

2. A multi-stage reformed-gas generator according to claim 1 wherein said gas permeable means comprise a gas permeable fabric.

3. A multi-stage reformed-gas generator according to claim 1 wherein said gas permeable means comprise perforated sheets.

4. A multi-stage reformed-gas generator according to claim 1 wherein the catalyst in each reaction chamber comprises a piled charge of ceramic porous hollow spheres.

5. A multi-stage reformed-gas generator according to claim 4 wherein said spheres consist of spherical corumdum with a wall thickness of between 0.1 and 0.5 mm and having a diameter of between 1 and 4 mm.

6. A multi-stage reformed-gas generator according to claim 5 wherein the wall thickness of said hollow spheres is approximately 0.3 mm and the diameter is between 1.2 and 2.5. mm.

7. A multi-stage reformed gas generator according to claim 4 and further including catalyst material impregnated in said hollow spheres.

8. A multi-stage reformed-gas generator according to claim 6 and further including catalyst material impregnated in said hollow spheres.

9. A multi-stage reformed-gas generator according to claim 4 wherein said hollow spheres are all of essentially the same diameter.

10. A multi-stage reformed-gas generator according to claim 6 wherein said hollow spheres are all of essentially the same diameter.

11. A multi-stage reformed-gas generator according to claim 1 wherein said gas permeable means are arranged to distribute the fed-in gas serving as an oxygen carrier uniformly over the entire flow cross section of the reaction gas within the catalyst, in the individual reaction chambers.

12. A multi-stage reformed-gas generator according to claim 11 wherein said gas permeable means comprises a gas permeable fabric made of stainless steel wire.

13. A multi-stage reformed-gas generator according to claim 12 wherein the mesh of the gas permeable fabric is smaller than the diameter of the particles of catalytic material.

14. A multi-stage reformed-gas generator according to claim 1 wherein the reaction chambers and gas permeable means disposed between the chambers are of a cylindrical shape with the reaction chambers arranged concentrically with each other and wherein said means for supplying gas serving as an oxygen carrier are coupled to said gas permeable means at at least one end of the cylinder so formed through ring lines which are in communication with the surface of the gas permeable means.

15. A multi-stage reformed-gas generator according to claim 1 wherein the reaction chambers and gas permeable means disposed between chambers are of a cylindrical shape with the reaction chambers arranged concentrically with each other and wherein said means for supplying gas serving as an oxygen carrier are coupled to said gas permeable means at at least one end of the cylinder so formed through ring lines which are in communication with the surface of the gas permeable means.

16. A multi-stage reformed-gas generator according to claim 15 wherein the cylinder so formed includes a bottom plate to which said gas permeable means are attached, said plate having slots therein in communication with said gas permeable means and with said ring lines.

17. A multi-stage reformed-gas generator according to claim 1 and further including a heat exchanger surrounding the reaction chambers through which air used as an oxygen carrier is passed in the direction counter to that of the reformed gas before being distributed by said gas permeable means and through which fuel is passed in crosswise direction to the reformed gas.

* * * * *